(12) United States Patent
Khasanov et al.

(10) Patent No.: US 7,913,717 B2
(45) Date of Patent: Mar. 29, 2011

(54) FAST ACTING GATE

(75) Inventors: Ilmer Yusupovich Khasanov, Salavat (RU); Snezhanna Vyacheslavovna Glukhovteva, Moscow (RU); Yuri Alexeevich Cherinkh, Salavat (RU); Vitaly Ivanovich Surikov, Astrakhan (RU); Ulfat Nurlygayanovich Sabirov, Moscow (RU)

(73) Assignee: Ilmer Yusupovich Khasanov (RU)

( * ) Notice: Subject to any disclaimer, the term of this patent is extended or adjusted under 35 U.S.C. 154(b) by 21 days.

(21) Appl. No.: 11/993,107

(22) PCT Filed: Jan. 19, 2007

(86) PCT No.: PCT/RU2007/000020
§ 371 (c)(1),
(2), (4) Date: Mar. 3, 2010

(87) PCT Pub. No.: WO2007/089171
PCT Pub. Date: Aug. 9, 2007

(65) Prior Publication Data
US 2010/0176127 A1    Jul. 15, 2010

(30) Foreign Application Priority Data
Feb. 1, 2006   (RU) .................................. 2006102920

(51) Int. Cl.
*F16L 55/10* (2006.01)
(52) U.S. Cl. ............ 138/89; 138/96 R; 138/92; 220/323; 220/321; 292/256.69
(58) Field of Classification Search ................ 138/89, 138/92, 96 R; 220/203.27, 315, 323, 321; 292/49, 256.67, 256.69
See application file for complete search history.

(56) References Cited

U.S. PATENT DOCUMENTS
3,155,116 A * 11/1964 Ver Nooy ........................ 138/89
3,667,649 A *  6/1972 Thillet ........................ 220/323
(Continued)

FOREIGN PATENT DOCUMENTS
RU          2249135 C1     3/2005

*Primary Examiner* — Patrick F Brinson
(74) *Attorney, Agent, or Firm* — Paul & Paul

(57) ABSTRACT

The invention can be used in pipelines, any devices, man holes and arrangements, at any pressures and working conditions for closable large-diameter pipes. The object of the present invention is to improve serviceability of a gate. The inventive gate comprises a lid consisting of a flange and a bottom which is caved-in inwards the pipe, a sleeve provided with a supporting ring which is welded to the bottom, arresting elements in the form of sectors inserted into a circular recess of the pipe when they are radially displaced on the flange along clamping bolts and on the supporting ring by the action of the inclined surface of a drive nut, are arranged on the end face of the flange and on the supporting ring. The nut is embodied in the form of a truncated pyramid provided with T-slots on lateral surfaces thereof. The sectors are provided with T-shaped tenons enabling movement of the sectors along the end surfaces of strengthening ribs, control markers are mounted on the sectors, a locking plate provided with a lever, said plate lowering into a gap embodied between the sectors and locking them by the action of a pneumatic cylinder in the presence of excessive pressure inside a closable pipe is arranged inside the lid. The nut may be embodied in the form of a truncated cone. The lid is mounted on articulated joints; the pipe with the lid is covered by a casing.

4 Claims, 2 Drawing Sheets

U.S. PATENT DOCUMENTS

| | | | |
|---|---|---|---|
| 3,672,403 A * | 6/1972 | Wilson et al. | 138/89 |
| 3,766,947 A * | 10/1973 | Osburn | 138/89 |
| 4,315,577 A * | 2/1982 | Bernson, Jr. | 220/323 |
| 4,387,740 A * | 6/1983 | Vanzant | 138/89 |
| 4,693,278 A * | 9/1987 | Wilson et al. | 138/89 |
| 6,003,558 A * | 12/1999 | Neto et al. | 138/89 |
| 6,029,709 A * | 2/2000 | Burgess | 138/89 |
| 6,286,553 B1 * | 9/2001 | Morgan | 138/89 |
| 7,533,699 B1 * | 5/2009 | Cellemme et al. | 138/89 |
| 7,665,485 B2 * | 2/2010 | Fulgosi | 138/89 |
| 2005/0161957 A1 * | 7/2005 | McGuire | 292/288 |

* cited by examiner

FAST ACTING GATE

FIELD OF THE INVENTION

The present invention relates to fast-acting gates for pipelines and apparatuses operating under both high and low pressures.

BACKGROUND OF THE INVENTION

There is known a gate—a device for locking a lid of a vessel operating under pressure (RU Patent 2249135; IPC F 16 J 13/16; claimed Aug. 18, 2003; published Mar. 27, 2005, Bulletin of Inventions No. 9), comprising: a lid with a mechanism for lifting thereof, said lid being installed on a body; a fast-disconnect conical-flanged joint; a lid-closing mechanism, said conical-flanged joint being made in the form of flanges of the body and the lid with a conical outer surface; and a separating device embracing ends of said flanges, said device being embodied to the shape of a pair of clips with a responsive conical drill through. Said lid-closing mechanism is provided with two hydraulic cylinders, whereas said lid-lifting mechanism is provided with a hydraulic jack, a gasket between a flange of the body and the lid is made coiled in the form of a metal framework.

The device requires a large number of mechanisms; installation of a pair of moving apart—bringing together clips may result in a uniform bringing together and tightening of the clips, particularly when the lid is sagged, and displacement of the gasket, a non-tight lid closure and unreliability of the gate operation. Moreover, the device fails to comprise safeguard elements against accidental and unauthorized depressurization.

The closets prior art with respect to the claimed technical solution is described in a fast-acting hand-driven gate (Kantorovich Z. B. "Apparatuses of Chemical Industry", Publishing House "Mashinostroenie", Moscow, 1965, pp. 255-257), comprising a drive in the form of a screw pair representing a trapezoidal threaded bushing with an outer surface being fitted with a nut in the form of rosette; sealing elements; a lid consisting of a flange and a bottom; a caved-in pipe (FIG. 176); stopping elements embodied to the shape of levers and fixing arms in the form of cramps with clamping bolts. Ends of said levers are freely rest on the lid. Flanges of an apparatus shell are provided with cramps adjustable for height, said cramps being attached to accommodate ends of clamping levers when the lid is closed with the initial rotation of a flywheel. In the course of subsequent rotation of a drive flywheel, rounded ends of the levers bear against the cramps while pressing the lid against the pipe through seals. The lid is finally fixed with clamping bolts.

The drawbacks to the known device consist in its unserviceability at high pressures, particularly with large diameter gates (a cantilever engagement of the lever with the cramp); inconvenience of operation (a need for adjusting height of screw cramps along the contour of a shell flange, aligning the position of rosette lugs with cramp mouths, fixing each cramp with locking screws. Moreover, the device is designed to close light, horizontally disposed lids and thus fails to comprise a turning hinge and a device for centering the lid with respect to the pipe.

SUMMARY OF THE INVENTION

It is an object of the present invention to improve serviceability, convenience and operation safety under conditions of both high and low pressures, with any diameters of closable pipes.

The above object has been achieved by the fact that in a fast-acting gate comprising a drive in the form of a screw pair, sealing elements, a lid consisting of a flange and a bottom which is caved-in inwards a pipe, arresting and fixing elements, arresting elements are made in the form of sectors inserted into a circular recess of the pipe when they are radially displaced, under the action of a drive nut, along the end face of the flange and a supporting ring of a sleeve which is welded to the inner surface of the bottom of the lid, and along clamping guiding-adjusting bolts mounted on the flange and the supporting ring of the sleeve through slots made on the sectors, the drive nut is embodied in the form of a truncated pyramid with lateral surfaces provided with T-slots which are responsive to inclined surfaces of contiguous butt ends of the sectors with T-shaped tenons. When the nut is moved in opposite direction, T-shaped tenons of the sectors pull them loose from a circular recess of the pipe by cheeks of T-slots of the nut thus forming a surface with the radius falling within outer radius of the lid flange. A gate lid is mounted on articulated joints with the possibility of adjusting its position with respect to a mounting seat into the pipe; in so doing, the pipe is provided with recesses to accommodate seals of the lid, the flange and the sectors, the last recess is made with the inclined surface which is responsive to the inclined contact surface on the upper side of the sectors. On the sectors, there are mounted control markers serving as indicators of completeness of their advance. Inside the lid, there is mounted a locking plate provided with a lever, said plate lowering into a gap embodied between the sectors and locking them by the action of a pneumatic cylinder rod in the presence of excessive pressure inside a closable pipe. On the side diametrically opposite to the hinge of the pipe lid, a protective casing is mounted on articulated joints; a number of lateral surfaces of the pyramid amounts to three and more depending on the lid diameter; in so doing, all friction surfaces are coated or reinforced with corrosion-resistant anti-scratch coating, for example by spraying. Alternatively, a drive nut may be embodied in the form of a truncated cone with a corresponding recess of a contact surface of the sectors, a T-slot provided on the sectors and a T-shaped tenon provided on the nut.

BEST MODE OF CARRYING OUT THE INVENTION

Figure 1:
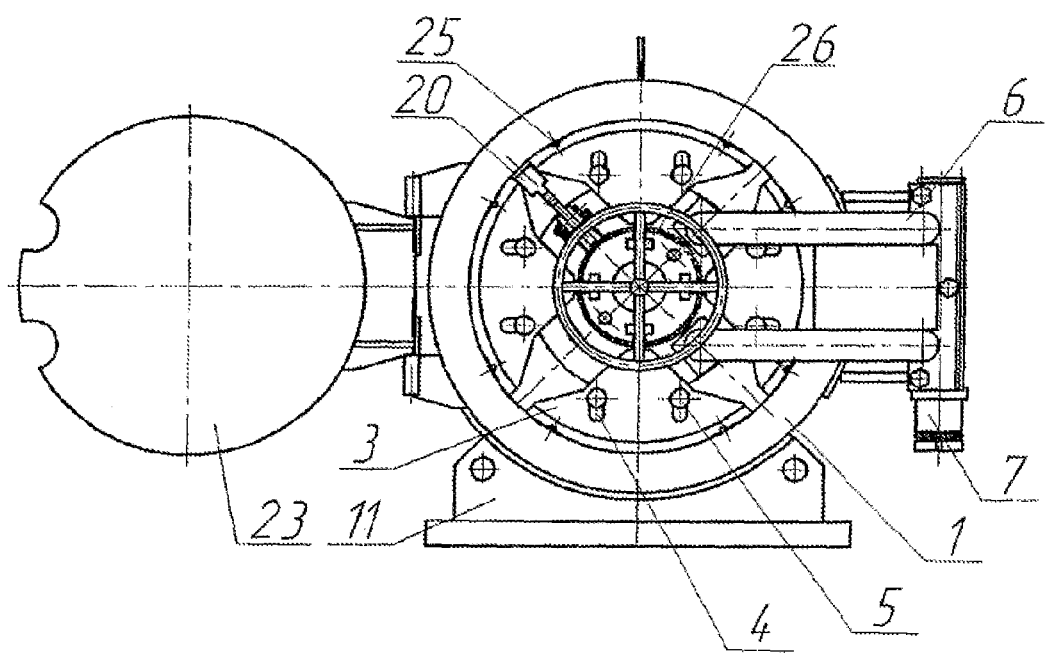
FIG. 1 is a general front view of a gate with an open casing.
Figure 2:
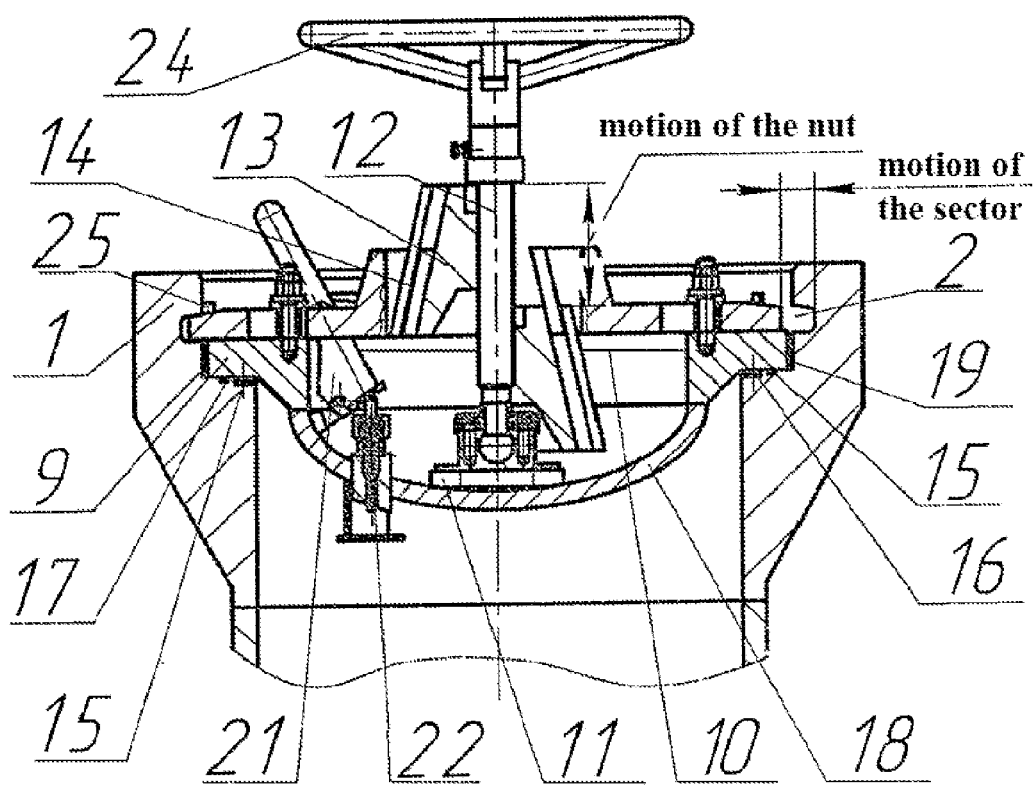
FIG. 2 depicts a section A-A of FIG. 1 (a gate is in open and closed state, without a casing).

A gate comprises a pipe 1 (FIGS. 1, 2) with a recess 2, sectors 3 with slots 4 for guiding-arresting bolts 5, a hinge 6 with adjusting-fastening bolts 7 and a lid 8 (FIG. 2) with a flange 9, a supporting ring 10 with a sleeve 11, a screw 12, a nut 13 with T-slots 14, a sealing ring 15 and a gasket 16, recesses 17 and 18 of the pipe 1 for the sealing ring 15 and the gasket 16, a recess 19 for the flange 9, a locking plate 20 (FIG. 1) with a lever 21, a hydraulic cylinder rod 22, a casing 23, a flywheel 24, control markers 25 and T-shaped tenons 26.

A gate operates as follows.

After having been attached to a pipe 1 and adjusted by means of a bolting 7 under conditions of a manufacturing plant, a turning lid of the gate comprising a bottom 8, a flange 9 and a hinge 6 is closed by rotating around the hinge 6 using a handle (not shown in figures) and set with the flange 6 into a recess 19 of a pipe 1. In so doing, a sealing ring 15 and gasket 16 are pressed with the flange 6 of the lid 8 against the recess 19 of the pipe 1. Then, by means of a flywheel 24 a nut 13 is extended by rotating a screw 12 about the axis. Lateral inclined surfaces of the nut 13 with T-slots push lateral contact surfaces of T-shaped tenons 26 of sectors 3 and set them into a recess 2 of the pipe, while pressing the flange 6 against the recess 19 and clamping the said sealing ring and gasket. The gate is closed, which is controlled by touching the control markers 25 to an inner generator of the pipe 1. When pressure is generated inside a pipe (an apparatus, pipeline and other article where a gate pipe is welded on), a hydraulic cylinder rod 22 by the action of pressure of a product (gas, liquid) is pulled out and actuates a lever 21 that lowers into a gap between the sectors 3 a locking plate 20, thus fixing the position of the sectors (blocking them), which is controlled visually.

After pressure is exhausted, which is controlled by the position of the locking plate that ascends above the sectors 3, the sectors 3 are unlocked. Using the same flywheel, a screw is turned in opposite direction thus moving the nut 13 inwards. In so doing, T-shaped tenons 26 of the sectors 3 pull the sectors and interlock them while disengaging the lid flange and opening the gate by rotating the lid around the hinge. Parts of the gate coated with solid corrosion-resistant materials possess increased hardness and wear resistance, function well in the absence of lubricants and are corrosion-resistant. A hermetically sealed casing protects parts of the gate against the influence of atmospheric processes and intervention of unauthorized persons.

From the above reasoning it is clear that the present invention affords reliability of closing and is characterized by the ease of maintenance.

INDUSTRIAL APPLICABILITY

A proposed fast-acting gate may be used in pipelines, any devices, at any pressures and working conditions, in man holes and chambers of feeding flow means into pipelines, filters—mud collectors of various designs, dust separators, access holes before inlet and outlet from compressors and many other gas and petroleum equipment as terminal gates of pipelines for gas, gaseous condensate, petroleum etc.

The gate may be manufactured and supplied also as a finished article to be attached to various pipes, including instead, for example, of the existing clamp gates or flanged joints.

A proposed design eliminates "dread" inherent in clamp gates, is less metal-consuming and repair-applicable without pyrogenous works.

Introduction of the proposed gate does not require a prolonged preparation and special equipment for its manufacture.

What is claimed is:

1. A fast-acting gate comprising a drive in the form of a screw pair, sealing elements, a lid consisting of a flange and a bottom which is caved-in inwards a pipe, arresting and fixing elements, wherein arresting elements are made in the form of sectors inserted into a circular recess of the pipe when they are radially displaced, under the action of a drive nut, along the end face of the flange and a supporting ring of a sleeve which is welded to the inner surface of the bottom of the lid, and along clamping guiding-adjusting bolts mounted on the flange and the supporting ring of the sleeve through slots made on the sectors, the drive nut is embodied in the form of a truncated pyramid with lateral surfaces provided with T-slots which are responsive to inclined surfaces of contiguous butt ends of the sectors with T-shaped tenons; when the nut is moved in opposite direction, T-shaped tenons of the sectors pull them loose from a circular recess of the pipe by cheeks of T-slots thus forming a surface with the radius falling within outer radius of the lid flange; a gate lid is mounted on articulated joints with the possibility of adjusting its position with respect to a mounting seat into the pipe; the pipe is provided with recesses to accommodate seals of the lid, the flange and the sectors, wherein the last recess is made with the inclined surface which is responsive to the inclined contact surface on the upper side of the sectors; control markers are mounted on the sectors; a locking plate provided with a lever, said plate being lowered into a gap embodied between the sectors and locked the sectors by the action of a pneumatic cylinder rod in the presence of excessive pressure inside a closable pipe is mounted inside the lid; a protective casing is mounted on articulated joints on the side diametrically opposite to the hinge of the pipe lid.

2. A gate as claimed in claim 1, wherein the number of lateral surfaces of the pyramid is at least three depending on the lid diameter; wherein all friction surfaces are coated, for example by spraying, with solid corrosion-resistant materials.

3. A gate as claimed in claim 1, wherein a drive nut is embodied in the form of a truncated cone.

4. A gate as claimed in claim 1, wherein the T-slots are provided on the sectors and T-shaped tenons are provided on the drive nut.

* * * * *